United States Patent [19]
Kanamori et al.

[11] Patent Number: 5,211,730
[45] Date of Patent: May 18, 1993

[54] METHOD FOR HEATING GLASS BODY

[75] Inventors: Hiroo Kanamori; Manzo Yamaguchi; Hikaru Satoh, all of Yokohama, Japan

[73] Assignee: Sumitomo Electric Industries, Ltd., Osaka, Japan

[21] Appl. No.: 908,881

[22] Filed: Jul. 7, 1992

Related U.S. Application Data

[63] Continuation of Ser. No. 626,776, Dec. 13, 1990, abandoned.

[30] Foreign Application Priority Data

Dec. 15, 1989 [JP] Japan ................................. 1-323946

[51] Int. Cl.$^5$ ...................... C03C 25/02; C03B 37/018
[52] U.S. Cl. ......................................... 65/3.12; 65/2; 65/27; 65/120
[58] Field of Search ................... 65/3.12, 2, 18.1, 27, 65/120

[56] References Cited

U.S. PATENT DOCUMENTS

| | | | |
|---|---|---|---|
| 4,280,829 | 7/1981 | Sheth | 65/3.12 |
| 4,302,230 | 11/1981 | MacChesney et al. | 65/30.1 |
| 4,367,013 | 1/1983 | Guerder et al. | 65/3.12 |
| 4,367,085 | 1/1983 | Suto et al. | 65/3.12 |
| 4,383,843 | 5/1983 | Iyengar . | |
| 4,389,229 | 6/1983 | Jang et al. | 65/29 |
| 4,402,720 | 9/1983 | Edahiro et al. | 65/3.12 |
| 4,421,540 | 12/1983 | Nakahara et al. | 65/3.12 |
| 4,435,199 | 3/1984 | Potkay | 65/3.12 |

FOREIGN PATENT DOCUMENTS

| | | |
|---|---|---|
| 3507498 | 9/1986 | Fed. Rep. of Germany . |
| 56-45843 | 4/1981 | Japan . |
| 57-23650 | 5/1982 | Japan . |
| 62-108745 | 5/1987 | Japan . |

OTHER PUBLICATIONS

Simpson, et al., High Rate MCVD, Journal of Non-Crystalline Solids 38 & 39 (1980) pp. 831–836.
Takao Kimura, "Spinning Method for Optical Fiber", Pat. Abst. of Japan, Nov. 26, 1982, vol. 6, No. 239 (C-137)[1117], p. 22 C 137.
Kazuo Tamagawa, "Process for Fire Polish of Glass . . . " Pat. Abst. of Japan, Jan. 12, 1984, vo. 8, No. 7 (C-204)[1444] 143 C 204.

Primary Examiner—Robert L. Lindsay
Attorney, Agent, or Firm—Cushman, Darby & Cushman

[57] ABSTRACT

Redeposition of glass particles is prevented by a method for heating a glass body comprising heating a part of the glass body with relatively moving the glass body and a heating source, wherein an inert gas is blown from inert gas-blowing means onto a surface of the glass body near a heated part of the glass body.

5 Claims, 2 Drawing Sheets

METHOD FOR HEATING GLASS BODY

This is a continuation of application Ser. No. 07/626,776, filed on Dec. 13, 1990, which was abandoned.

BACKGROUND OF THE INVENTION

1. Field of the Invention

The present invention relates to a method for heating a glass body, which is particularly useful for fire polishing or cleaning, or heating and stretching a glass preform for an optical fiber.

2. Description of the Related Art

In general, a quartz base optical fiber is produced by forming a glass preform having an analogous cross sectional structure as that of an optical fiber to be fabricated and melting and stretching (spinning) the glass preform to fabricate the optical fiber.

To produce the glass preform, various methods have been practically used. In any method, the final glass preform from which the optical fiber can be fabricated is obtained after the glass preform or its precursor is thermally treated with an external heat source. Some of the examples of such thermal treatment are found in a VAD method, namely "fire polishing" by which a peripheral surface of the glass preform is smootheened with a flame just before spinning, and "stretching" of a transparent glass preform to a desired diameter.

For example, the fire polishing is carried out as shown in FIG. 1. That is, a glass preform 10 as a glass body is supported with a pair of rotatable chucks 11 and 12 and then heated with a burner 13 as a heat source. Since the burner 13 can heat a part of the glass preform 10 at one time, it is moved in a direction L in parallel with a longitudinal direction of the glass preform 10 so as to heat desired parts of the glass preform.

For example, the stretching of the glass preform is carried out as shown in FIG. 2. That is, the glass preform 10 is supported with a pair of chucks 11' and 12', one of which (the chuck 12' in FIG. 2) rotates the glass preform 10 as indicated by the arrow N and pulls it in the longitudinal direction M. Simultaneously, a burner 13' heats and softens a part of the glass preform 10 and moves in a direction L along the longitudinal direction of the glass preform as the glass preform is melted and stretched. The glass preform is stretched to a desired diameter by controlling the moving speeds of the chuck 12' and the heating rate with the burner 13'.

A flame generated with a conventionally used burner such as an oxyhydrogen burner, a natural gas burner and/or a petroleum gas burner can be used as the heating source. In addition, an electric furnace having a ring heater or a high-frequency induction furnace can be used as a heat source.

In the stretching of the glass preform, since the glass preform should be heated to a softening point, namely 1200° C. or higher to its center part, the surface temperate reaches about 1500° to 1600° C.

In the case of fire polishing, the surface of the glass preform should be heated to about 1500° to 1600° C. to achieve sufficient surface smoothness.

To heat the surface of the glass preform to about 1500° to 1600° C. in the fire polishing and stretching of the glass preform, there arise the following problems:

1. Since the surface of the glass preform is heated, components of glass liberate from the surface and form fine particles of glass which float in an atmosphere near a heating part. The floating glass particles redeposit on a non-heated surface of the glass preform and contaminate the glass preform.

2. To remove the redeposited glass particles, only the redeposited glass particles are to be evaporated and the surface of the glass preform should be reheated at a temperature at which new glass particles are not formed. However, it is very difficult to evaporate all the redeposited glass particles by reheating, so that a part of the redeposited glass particles are melted and integrated with the glass preform to contaminate the surface of the glass preform.

In addition, when the glass preform has a large diameter, the surface of the glass preform is heated but the center part of the glass preform is not heated by the above reheating. Therefore, only the surface of the glass preform shrinks during cooling and residual stress remains on the surface of the glass preform and the produced glass preform tends to be easily broken.

SUMMARY OF THE INVENTION

An object of the present invention is to provide a method for heating a glass body by which redeposition of glass particles on the glass body surface is prevented.

According to the present invention, there is provided a method for heating a glass body comprising heating a part of the glass body with relatively moving the glass body and a heating source, wherein an inert gas is blown from inert gas-blowing means onto a surface of the glass body near a heated part of the glass body to prevent redeposition of glass particles on the glass body surface.

DETAILED DESCRIPTION OF THE DRAWINGS

A preferred embodiment of the method of the present invention is explained by making reference to accompanying drawings.

Figure 3:
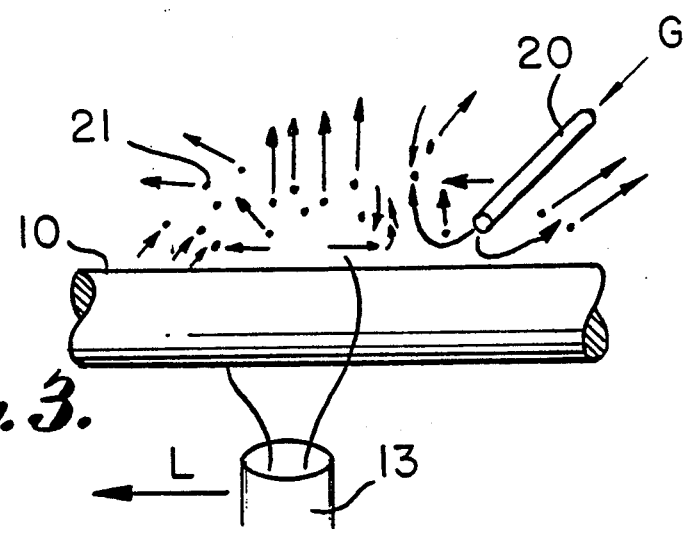
FIG. 3 is an enlarged front view of a glass body which is heated while blowing an inert gas onto a surface of the glass body according to the present invention.

FIG. 3 is an enlarged view of a glass body which is heated while blowing an inert gas onto a surface of the glass body.

A glass preform 10 is supported with a pair of chucks (not shown), and a burner 13 moves in a direction in parallel with the glass body 10 and heats a part of the glass body 10. An inert gas-blowing nozzle 20 is provided and moves along the glass preform keeping a relative position to the burner 13. An inert gas G is blown on a surface of the glass preform 10 near the heated part of the glass preform 10. By the blowing of inert gas, fine glass particles 21 which are reformed by heating with the burner 13 are blown off and their redeposition on the glass preform surface is prevented.

Preferably, the inert gas-blowing nozzle 20 is positioned so that the inert gas is blown from the opposite side of the burner 13, although other positioning may be possible.

For example, when the glass preform 10 is horizontally supported and heated with the burner 13 from the lower side of the glass preform 10 as shown in FIG. 3, the inert gas-blowing nozzle 20 is preferably positioned above the glass preform 10. This is because, the reformed glass particles 21 are floated on the upper side of the glass preform 10 due to a gas flow from the burner 13 and then return to the glass preform due to turbulence of gas flow or gravity so as to redeposit on the surface of the glass preform opposite to the burner. Therefore, it is most effective to blow the inert gas onto a part of the glass preform surface where the glass particles tend to deposit.

When the ring heater, which heats the peripheral surface of the glass preform from all directions, is used plural inert gas-blowing nozzles are positioned around the glass preform in a ring form.

When one inert gas-blowing nozzle 20 is provided as shown in FIG. 3, the formed glass particles may be deposited on a surface of the glass preform on the side on which no such nozzle is provided. Therefore it is preferable to provide the inert gas-blowing nozzles on each side of the burner 13.

On the side to which the burner is moved (the side L in FIG. 3), it is possible to reevaporate the redeposited glass particles 21 with the burner 13. Therefore, the inert gas-blowing burner is not necessarily provided on that side when the glass preform is not long.

The number and shape of the inert gas-blowing nozzle, its exact positioning and the amount of the inert gas to be blown vary with the heat source to be used. That is, these parameters depend on other conditions such as the shape of the glass preform to be heated, the structure of the burner, the amount of energy generated by the burner, and the like, and can be easily adjusted. Some examples of the parameters are explained in following Examples.

The inert gas to be blown from the inert gas-blowing nozzle may be any gas that has no or little influence on the combustion reaction of the burner 13 and is stable at high temperatures. Preferred examples of the inert gas are nitrogen, argon and helium.

PREFERRED EMBODIMENTS OF THE INVENTION

The present invention will be illustrated by following Examples.

EXAMPLE 1

Figure 1:
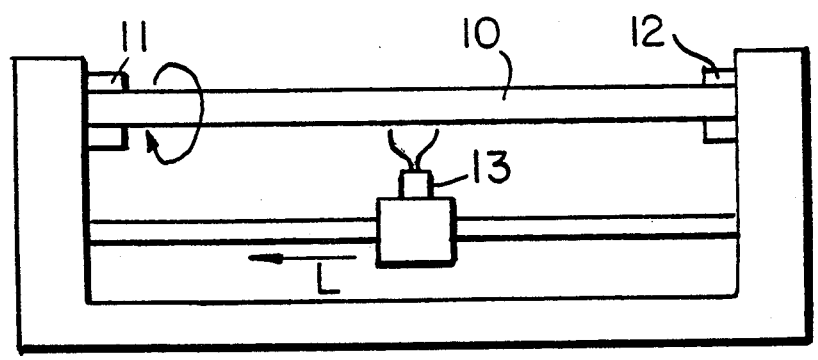
FIG. 1 schematically shows an apparatus for fire polishing a glass preform.

A glass preform for a single mode optical fiber which consisted of a core made of $GeO_2$—$SiO_2$ glass and a cladding made of $SiO_2$ glass and had an outer diameter of 60 mm and a core diameter of 4.2 mm was fire polished with an apparatus as shown in FIG. 1 to which an inert gas-blowing nozzle was provided as shown in FIG. 3.

Figure 4:
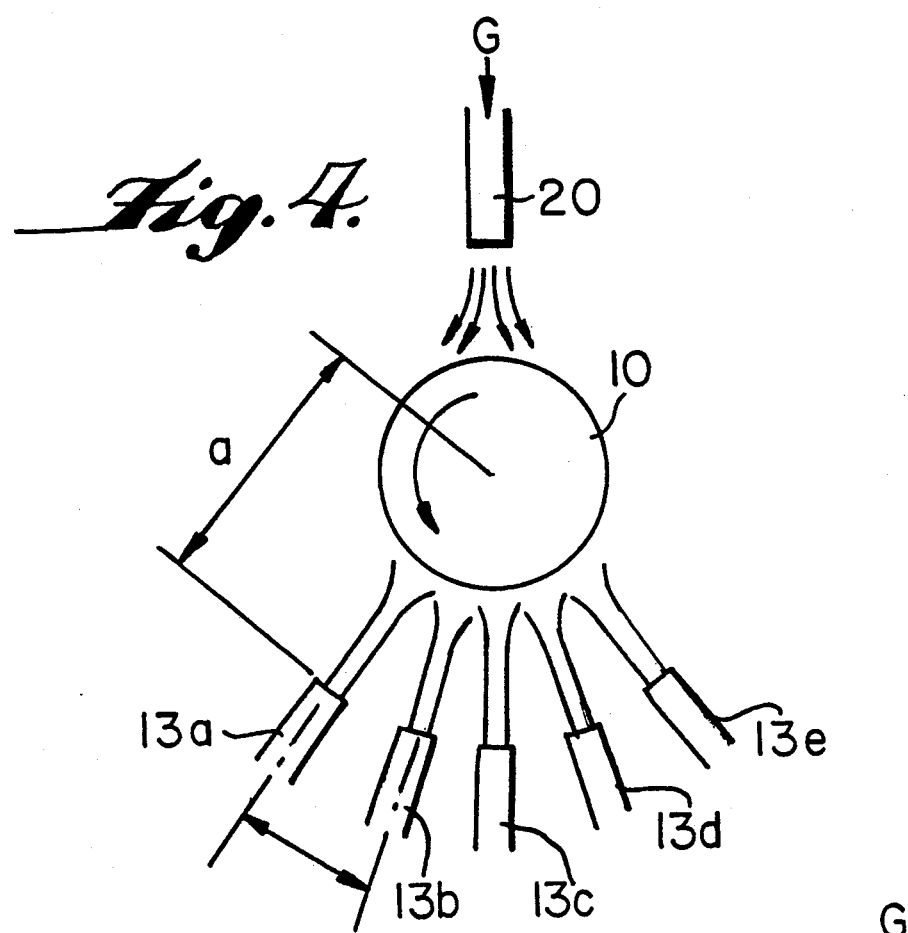
FIG. 4 is a side view of the glass body of FIG. 3.
Figure 5:
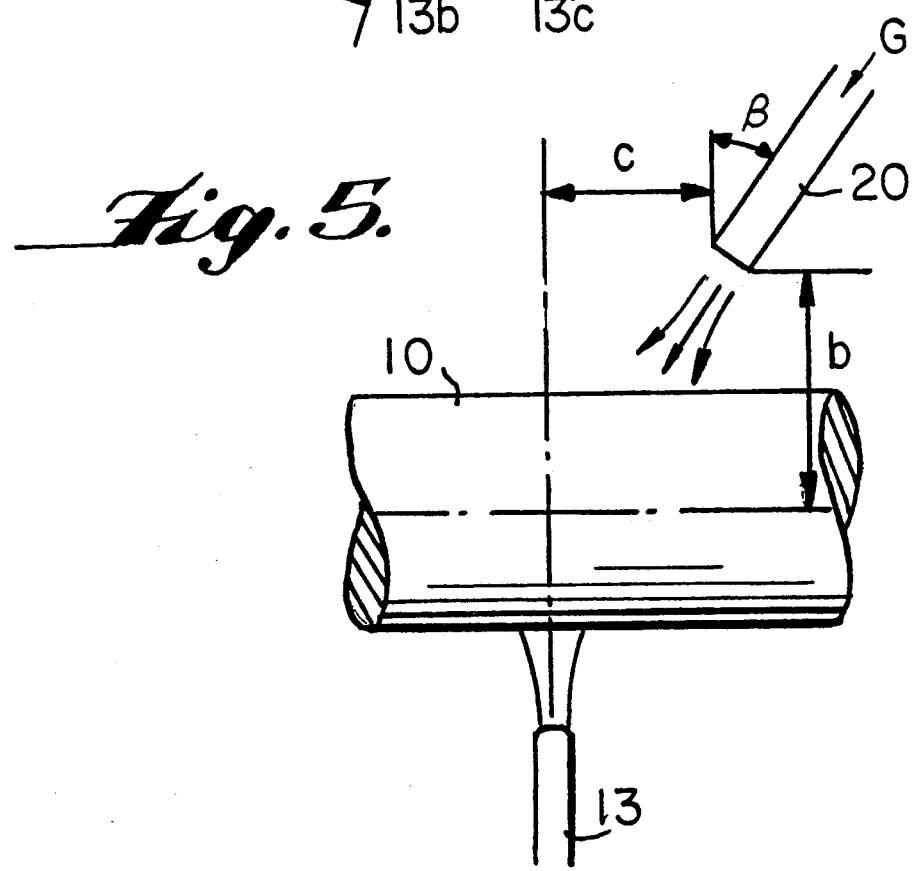
FIG. 5 shows relative positions of the burner and the inert gas-blowing nozzle.

As a heat source, five oxyhydrogen burners 13a to 13e were used as shown in FIG. 4. The distance "a" from the center axis of the glass preform 10 to a tip end of each burner was 100 mm. The burners were placed on a common plane which was perpendicular to the center axis of the glass preform, and the angle $\alpha$ between adjacent burners was about 25 degrees. A spacial relationship between the inert gas-blowing nozzle 20 and the burners 13a to 13e is shown in FIG. 5. As seen from FIG. 5, the distance "b" from a tip end of the nozzle 20 to the center axis of the glass preform 10 was 40 mm, and the horizontal distance "c" from the tip end of the nozzle 20 to the burners 13 was 50 mm. The nozzle slanted from the vertical line at an angle $\beta$ of 30 degrees. The nozzle had a diameter of 5 mm.

The fire polishing conditions were as follows:
Gases supplied to the burners 13:
$H_2$: 120 liters/min.
$O_2$: 50 liters/min.
Moving speeds of the nozzle 20 and the burners 13:
5 mm/min.
Inert gas supplied to the nozzle 20:
$N_2$ at 20 liters/min.

The glass preform was fire polished under the above conditions. No deposited glass particle was observed with eyes.

Fifteen glass preforms were fire polished but none of them was cracked.

COMPARATIVE EXAMPLE 1

Under the same conditions as in Example 1 but no nitrogen gas was blown from the nozzle 20, a glass preform was fire polished. On the abrased surface, glass particles were deposited to a thickness of about 0.2 mm. To remove the deposited glass particles, the glass preform was reheated by the same apparatus with supplying $H_2$ at 80 liters/min. and $O_2$ at 30 liters/min. at a moving speed of the burner of 30 mm/min. Although the deposited glass particles were removed, 80% or more of the reheated glass preforms cracked during cooling.

EXAMPLE 2

Figure 2:
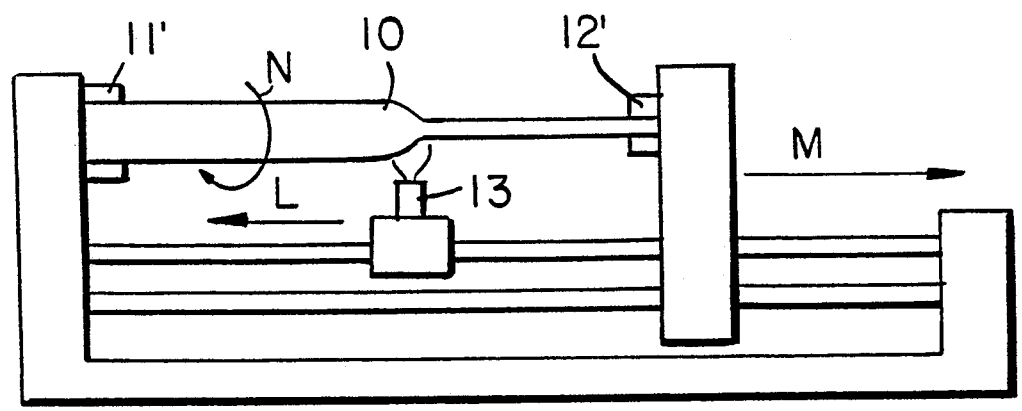
FIG. 2 schematically shows an apparatus for stretching a glass preform.

A glass preform for a single mode optical fiber which consisted of a core made of $GeO_2$—$SiO_2$ glass and a cladding made of $SiO_2$ glass and had an outer diameter of 45 mm and a core diameter of 10 mm was stretched with an apparatus as shown in FIG. 2 to which an inert gas-blowing nozzle having a diameter of 7 mm was provided.

The positioning of the burner and the nozzle was the same as in Example 1.

The stretching conditions were as follows:
Gases supplied to the burners 13:
$H_2$: 120 liters/min.
$O_2$: 50 liters/min. Moving speeds of the nozzle 20 and the burners 13:
8 mm/min.
Moving speed of the chuck:
10 mm/min. on the average (with minuted adjustment to control the outer diameter)
Inert gas supplied to the nozzle 20:
$N_2$ at 30 liters/min.

The glass preform was stretched under the above conditions. No deposited glass particle was observed with eyes.

Twenty five glass preforms were stretched but none of them was cracked.

COMPARATIVE EXAMPLE 2

Under the same conditions as in Example 2 but no nitrogen gas was blown from the nozzle 20, a glass preform was stretched. On the surface of stretched glass preform, glass particles were deposited in a thickness of about 0.3 mm.

To remove the deposited glass particles, the glass preform was reheated by the same apparatus with supplying $H_2$ at 80 liters/min. and $O_2$ at 30 liters/min. at a moving speed of the burner of 30 mm/min. Although the deposited glass particles were removed, 30% of the reheated glass preforms cracked during cooling.

What is claimed is:

1. A method for heating a glass preform for fabrication of an optical fiber comprising heating a part of the glass preform with a relatively moving heating source in a direction parallel with an axis of the glass preform from one end to other end of the glass preform, wherein an inert gas is blown from an inert gas-blowing means onto a surface of the glass preform near a heated part of the glass preform and the inert gas-blowing means is positioned near the heating source on the opposite side of the moving direction of the heating source and said inert gas-blowing means is moved in the same manner as that of the heating source to prevent a redeposition of glass particles on the glass preform, the glass particles are generated and liberated from the heated surface of the glass preform and float in an atmosphere near the glass preform.

2. The method according to claim 1, wherein an incident angle of said inert gas-blowing means is adjustable with respect to a longitudinal axis of said glass preform.

3. The method according to claim 1, wherein said glass body is fire polished.

4. The method according to claim 1, wherein said glass body is stretched to a desired diameter.

5. The method according to claim 1, wherein said inert gas is selected from the group consisting of nitrogen, argon and helium.

* * * * *